US012542121B2

(12) United States Patent
Wang et al.

(10) Patent No.: US 12,542,121 B2
(45) Date of Patent: Feb. 3, 2026

(54) ACTIVE NOISE REDUCTION SYSTEM

(71) Applicant: HONDA MOTOR CO., LTD., Tokyo (JP)

(72) Inventors: Xun Wang, Saitama (JP); Toshio Inoue, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 18/170,042

(22) Filed: Feb. 16, 2023

(65) Prior Publication Data

US 2023/0290328 A1 Sep. 14, 2023

(30) Foreign Application Priority Data

Mar. 9, 2022 (JP) ................................ 2022-036172

(51) Int. Cl.
*G10K 11/178* (2006.01)

(52) U.S. Cl.
CPC .. *G10K 11/17825* (2018.01); *G10K 11/17823* (2018.01)

(58) Field of Classification Search
CPC ....... G10K 11/17825; G10K 11/17823; G10K 11/17875; G10K 2210/1282; G10K 2210/3025; G10K 11/17854; G10K 11/17817; G10K 2210/3022; G10K 2210/3023; G10K 2210/3028
See application file for complete search history.

(56) References Cited

U.S. PATENT DOCUMENTS 10,600,401 B2 3/2020 Ueno et al.
2008/0152158 A1* 6/2008 Sakamoto ........ G10K 11/17823 381/71.4
2008/0310650 A1 12/2008 Nakamura et al.
2019/0259371 A1* 8/2019 Ueno ...................... B60R 11/02
2022/0319489 A1* 10/2022 Yuzuriha ............ G10L 21/0224

FOREIGN PATENT DOCUMENTS

JP H0350998 A 3/1991
JP 2007025527 A 2/2007
JP 2015169915 A 9/2015
JP 2018005062 A 1/2018

OTHER PUBLICATIONS

Notice of Reasons for Refusal for Japanese Patent Application No. 2022-036172 dated Oct. 14, 2025; 6 pp.

* cited by examiner

*Primary Examiner* — Carolyn R Edwards
*Assistant Examiner* — Aaron Justin Thompson
(74) *Attorney, Agent, or Firm* — Armstrong Teasdale LLP

(57) ABSTRACT

An active noise reduction system includes a canceling sound generator configured to generate a canceling sound for canceling a noise, an error detector configured to detect an error between the noise and the canceling sound and generate an error signal corresponding to the error, and a controller configured to control the canceling sound generator based on the error signal, wherein the controller is configured to extract noise components at a plurality of frequencies based on the error signal, determine a control target frequency among the plurality of frequencies based on the noise components at the plurality of frequencies, select a value of a prescribed control parameter based on the control target frequency, and generate a control signal to control the canceling sound generator based on the selected value of the control parameter.

5 Claims, 10 Drawing Sheets

*Fig.3*

T1 fc →

| frequency | control parameter | | | |
|---|---|---|---|---|
| | FB gain | FB phase | target noise reduction | ... |
| f1 | 0.8 | 20° | 6dB | ... |
| f2 | 0.5 | 89° | 4dB | ... |
| ... | ... | ... | ... | ... |
| fk | 1.2 | 60° | 8dB | ... |

→ control signal output unit

*Fig.6*

T2

| frequency | correction coefficient |
|---|---|
| f1 | 0.5 |
| f2 | 0.8 |
| ... | ... |
| fk | 1.2 |

Fig.8

T3

| frequency | control parameter | | | | |
|---|---|---|---|---|---|
| | $\mu$ 1 | $\mu$ 2 | target noise reduction | FB gain upper limit | ・・・ |
| f1 | 0.01 | 0.02 | 6dB | 0.8 | ・・・ |
| f2 | 0.05 | 0.05 | 4dB | 0.5 | ・・・ |
| ・・・ | ・・・ | ・・・ | ・・・ | ・・・ | ・・・ |
| fk | 0.02 | 0.04 | 8dB | 1.2 | ・・・ |

ACTIVE NOISE REDUCTION SYSTEM

TECHNICAL FIELD

The present invention relates to an active noise reduction system that reduces a noise by causing a canceling sound in an opposite phase to the noise to interfere with the noise.

BACKGROUND ART

In a typical vehicle, a wheel vibrates due to the force received from a road surface. When this vibration is transmitted to a vehicle body via a suspension, a road noise is generated inside a vehicle cabin. In particular, a narrow band road noise (more specifically, a road noise that has a peak in the vicinity of 40 to 50 Hz and keeps a constant bandwidth) that is excited by acoustic resonance characteristics of a closed space such as a vehicle cabin is called “drumming noise”. The drumming noise reaches the occupant’s ears as a roaring muffled sound, and thus tends to make the occupant feel uncomfortable.

JP2007-25527A proposes an active noise reduction system for reducing such a drumming noise. This active noise reduction system uses as a control input a noise signal at a control point detected by a microphone, and generates a control signal by adjusting the amplitude and phase of the noise signal.

In more detail, with reference to FIG. 1 of JP2007-25527A, a processing circuit 101 extracts an f0 component of the noise signal detected by the microphone. The f0 component is a component at a control target frequency f0 (in FIG. 1, $\theta 0=2\pi f0$). An adjusting circuit 108 generates the control signal by adjusting the amplitude and phase of the f0 component of the noise signal extracted by the processing circuit 101.

The processing circuit 101 includes a single-frequency adaptive notch filter (SAN filter) having coefficients A and B, and a generator that generates reference signals (sine wave and cosine wave). The frequency of the reference signals is set to the control target frequency f0. The coefficients A and B of the SAN filter are updated using an adaptive algorithm such that an error signal e1 (e1=e+Vout1), which is generated by a noise signal e detected by the microphone and an output Vout1 of the SAN filter, is minimized. Consequently, “Vout1=−e” is satisfied. More specifically, the output Vout1 of the SAN filter is a narrowband signal centered at the control target frequency f0. Accordingly, “Vout1=−e” is satisfied at the control target frequency f0. That is, the f0 component of the noise signal is extracted. FIG. 5 of JP2007-25527A shows characteristics of the processing circuit 101.

The adjusting circuit 108 corrects acoustic characteristics C (that includes characteristics of an interior space of a vehicle cabin and electronics) from a speaker to the microphone and thus generates the control signal. With reference to FIG. 8 of JP2007-25527A, the adjusting circuit 108 includes a SAN filter for noise extraction and a notch filter. The SAN filter has the coefficients A and B. The notch filter has coefficients Sa and Sb and indicates characteristics of the adjusting circuit 108. As a setting example, the acoustic characteristics C are previously measured as C^, and the notch filter is set to the reciprocal 1/C^ of C^ at the control target frequency f0. At the position of the microphone, the following formula (1) is satisfied. Incidentally, “e” in the following formula (1) indicates the sound pressure of the noise signal after control, and “d^” in the following formula (1) indicates the sound pressure of the noise signal before control.

$$e = d + \frac{Vout1}{\hat{C}} * C \approx d - e \rightarrow e = \frac{d}{2}, \tag{1}$$

Assuming C^=C, the sound pressure of the noise signal after control is ½ of the sound pressure d of the noise signal before control. Accordingly, the noise can be reduced by about 6 dB.

By the way, with regard to the narrowband road noise (hereinafter referred to simply as “noise”) as described above, the sound pressure of the noise in the vehicle cabin is determined by the product of the input condition (vibration of the wheel due to the force received from the road surface) of the noise and the transfer characteristics (characteristics of a vehicle body, acoustic characteristics of a vehicle cabin, or the like) of the noise. The resonance frequency of the transfer characteristics of the noise does not change depending on the traveling conditions of the vehicle (conditions of a road surface, a vehicle speed, or the like). On the other hand, the input condition of the noise changes depending on the traveling conditions of the vehicle, and the peak frequency of the noise may also vary by several Hz accordingly. The conventional active noise reduction system only reduces the noise whose peak frequency is a preset fixed frequency. Accordingly, the conventional active noise reduction system cannot follow the change in the peak frequency of the noise, and thus the noise may remain at the peak frequency.

SUMMARY OF THE INVENTION

In view of the above background, an object of the present invention is to provide an active noise reduction system that effectively reduces the noise at the peak frequency by following the change in the peak frequency of the noise due to the change in the input condition.

To achieve such an object, one aspect of the present invention provides an active noise reduction system (11), comprising: a canceling sound generator (13) configured to generate a canceling sound for canceling a noise; an error detector (14) configured to detect an error between the noise and the canceling sound and generate an error signal corresponding to the error; and a controller (15) configured to control the canceling sound generator based on the error signal, wherein the controller is configured to: extract noise components at a plurality of frequencies based on the error signal, determine a control target frequency among the plurality of frequencies based on the noise components at the plurality of frequencies; select a value of a prescribed control parameter based on the control target frequency; and generate a control signal to control the canceling sound generator based on the selected value of the control parameter.

According to this aspect, by determining the control target frequency among the plurality of frequencies, it is possible to cause the control target frequency to follow the change in the peak frequency of the noise due to the change in the input condition. Accordingly, the noise at the peak frequency can be effectively reduced.

In the above aspect, preferably, the controller is further configured to: calculate absolute values of the noise components at the plurality of frequencies (step ST1); calculate correction values of the noise components at the plurality of frequencies by correcting the absolute values of the noise components at the plurality of frequencies (step ST2, ST3); identify a maximum value among the correction values of the noise components at the plurality of frequencies by comparing the correction values of the noise components at the plurality of frequencies (step ST4); and determine a corresponding frequency as the control target frequency, the corresponding frequency corresponding to the maximum value among the correction values of the noise components (step ST5).

According to this aspect, by correcting and then comparing the absolute values of the noise components at the plurality of frequencies, it is possible to appropriately determine the control target frequency. Accordingly, it is possible to enhance the followability of the control target frequency to the change in the peak frequency of the noise.

In the above aspect, preferably, the controller is further configured to correct the absolute values of the noise components at the plurality of frequencies based on a correction table that defines a correction coefficient for each of the plurality of frequencies according to hearing characteristics of humans (step ST3).

According to this aspect, a user (for example, an occupant of a vehicle) of the active noise reduction system can easily realize the noise reduction effect.

In the above aspect, preferably, the controller is further configured to correct the absolute values of the noise components at the plurality of frequencies based on target noise reduction at each of the plurality of frequencies (step ST2).

According to this aspect, based on the target noise reduction at each of the plurality of frequencies, it is possible to convert the absolute values of the noise components after noise reduction to the absolute values of the noise components before noise reduction. Accordingly, it is possible to determine the control target frequency more appropriately.

In the above aspect, preferably, the controller is further configured to: at prescribed sampling cycles, extract the noise components at the plurality of frequencies and calculate the absolute values of the noise components at the plurality of frequencies; and calculate a current value of the absolute value of the noise component at each of the plurality of frequencies based on a previous value of the absolute value of the noise component at each of the plurality of frequencies and a current value of the noise component at each of the plurality of frequencies (step ST1).

According to this aspect, it is possible to suppress frequent switching of the control target frequency due to the noise or the like included in the noise component at each of the plurality of frequencies.

In the above aspect, preferably, the controller is further configured to: store a control parameter table (T1, T3) that defines the value of the control parameter at each of the plurality of frequencies; and select the value of the control parameter corresponding to the control target frequency by referring to the control parameter table based on the control target frequency.

According to this aspect, it is possible to generate the control signal using the optimum value of the control parameter corresponding to the control target frequency.

Thus, according to the above aspects, it is possible to provide an active noise reduction system that effectively reduces the noise at the peak frequency by following the change in the peak frequency of the noise due to the change in the input condition.

BRIEF DESCRIPTION OF THE DRAWING(S)

FIG. 3 shows a control parameter table according to the first embodiment;

FIG. 6 shows a correction table according to the first embodiment;

FIG. 8 shows a control parameter table according to the second embodiment;

DETAILED DESCRIPTION OF THE INVENTION

Figure 1:
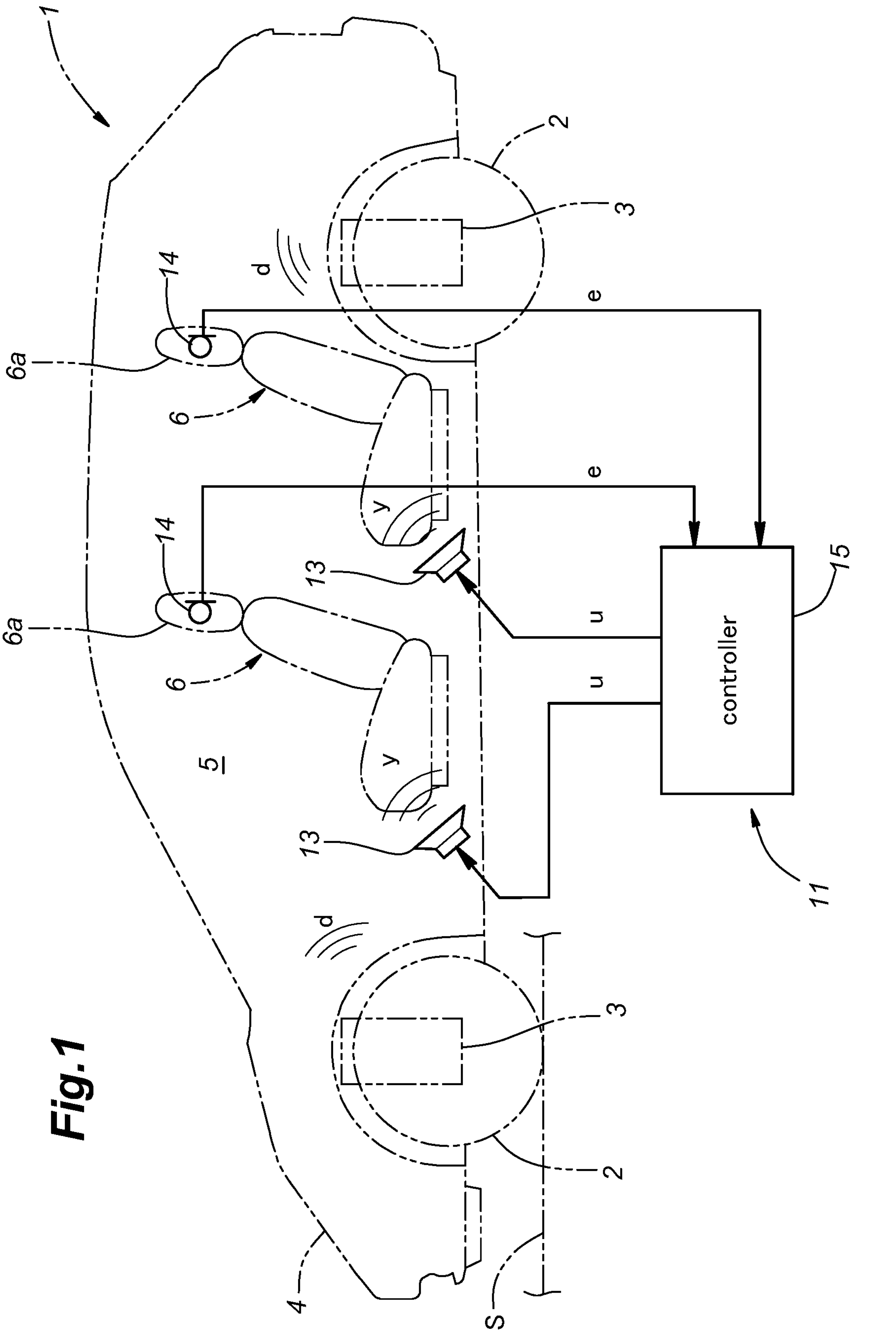
FIG. 1 is a schematic diagram showing a vehicle to which an active noise reduction system according to the first embodiment is applied.

In the following, embodiments of the present invention will be described with reference to the drawings. In this specification, "^" (circumflexes) shown together with symbols each indicate an identification value or an estimation value. "^" are shown above the symbols in the drawings and formulas, but are shown subsequently to the symbols in the text of the description.

The First Embodiment

First, the first embodiment of the present invention will be described with reference to FIGS. 1 to 7.

<The Active Noise Reduction System 11>

FIG. 1 is a schematic diagram showing a vehicle 1 to which an active noise reduction system 11 (hereinafter abbreviated as "noise reduction system 11") according to the first embodiment is applied. When wheels 2 vibrate due to the force received from the road surface S and the vibration of the wheels 2 is transmitted to a vehicle body 4 via suspensions 3, a drumming noise d (an example of a noise) is generated in a vehicle cabin 5. The drumming noise d is a narrow band road noise having a peak around 40-50 Hz.

The noise reduction system 11 is a feedback-controllable active noise control device (ANC device) for reducing such a drumming noise d. More specifically, the noise reduction system 11 reduces the drumming noise d by generating a canceling sound y in an opposite phase to the drumming noise d and causing the generated canceling sound y to interfere with the drumming noise d.

Figure 2:
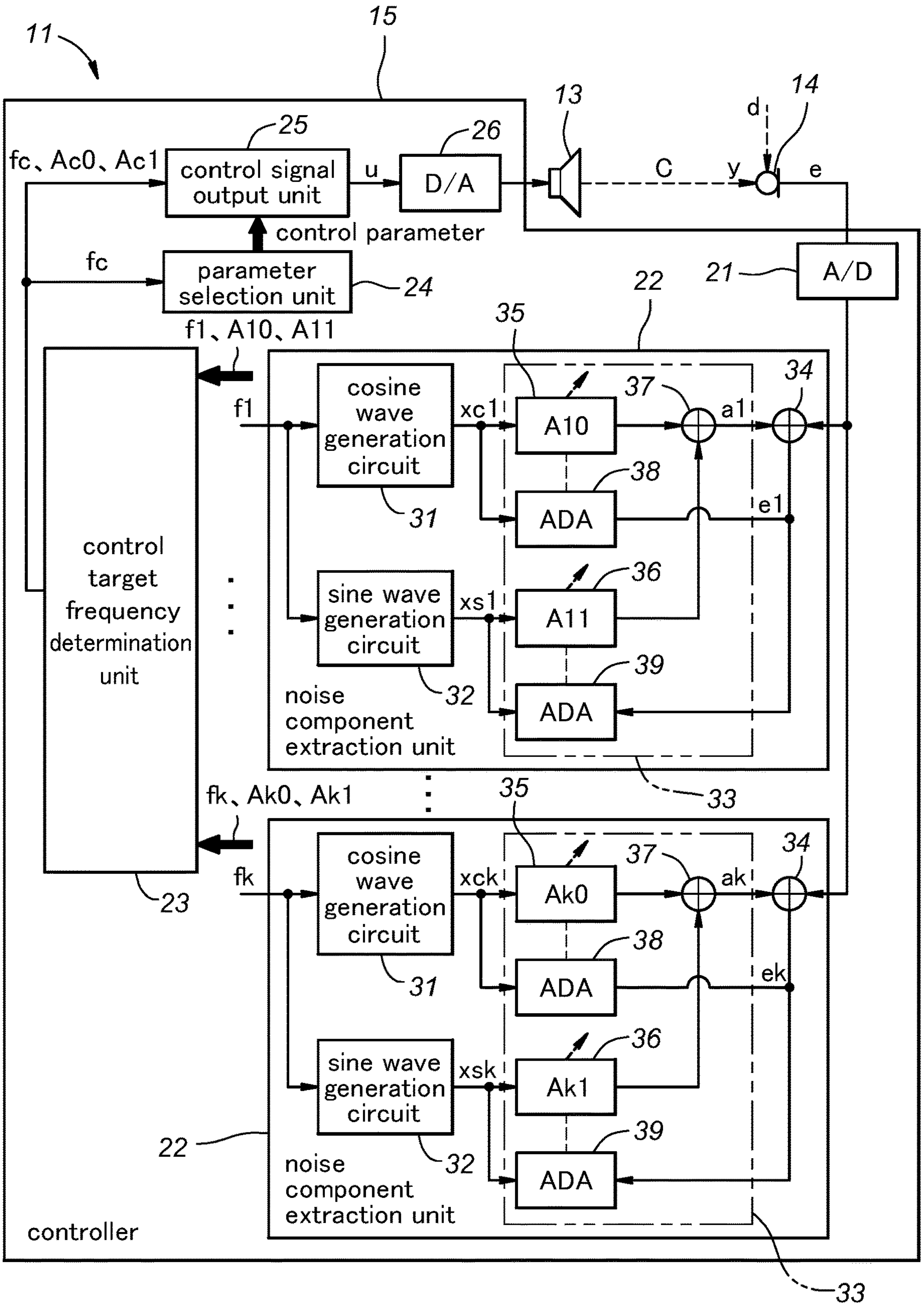
FIG. 2 is a functional block diagram showing the active noise reduction system according to the first embodiment.

With reference to FIGS. 1 and 2, the noise reduction system 11 includes a plurality of speakers 13 (an example of a canceling sound generator) configured to generate the canceling sound y for canceling the drumming noise d, a plurality of error microphones 14 (an example of an error detector) configured to detect an error (synthetic sound) between the drumming noise d and the canceling sound y and generate an error signal e corresponding to the detected error, and a controller 15 configured to control the plurality of speakers 13 based on the error signal e. A symbol C in FIG. 2 indicates transfer characteristics of a secondary path from each speaker 13 to the corresponding error microphone 14.

<The Speakers 13>

With reference to FIG. 1, each speaker 13 of the noise reduction system 11 constitutes, for example, a portion of an audio system of the vehicle 1, and is installed in a door of the vehicle 1. In another embodiment, the speaker 13 may be provided separately from the audio system of the vehicle 1, or may be installed in a location other than the door of the vehicle 1 (for example, the speaker 13 may be installed in a headrest 6*a* of an occupant seat 6 or on a floor below the occupant seat 6).

<The Error Microphones 14>

Each error microphone 14 of the noise reduction system 11 is installed, for example, in the headrest 6*a* of the occupant seat 6. In another embodiment, the error microphone 14 may be installed in a location other than the occupant seat 6 of the vehicle 1 (for example, the error microphone 14 may be installed on a ceiling above the occupant seat 6).

<The Controller 15>

The controller 15 of the noise reduction system 11 consists of an electronic control unit (ECU) that includes an arithmetic processing unit (a processor such as CPU and MPU) and a storage device (memory such as ROM and RAM). The controller 15 may consist of one piece of hardware, or may consist of a unit composed of plural pieces of hardware.

With reference to FIG. 2, the controller 15 includes, as functional components, an A/D conversion unit 21, a plurality of noise component extraction units 22, a control target frequency determination unit 23, a parameter selection unit 24, a control signal output unit 25, and a D/A conversion unit 26. Symbols “ADA” in FIG. 2 indicate “adaptive”.

<The A/D Conversion Unit 21>

The A/D conversion unit 21 of the controller 15 converts an analog error signal e output from the error microphone 14 into a digital error signal e, and outputs the digital error signal e to the plurality of noise component extraction units 22. Hereinafter, “error signal e” without explanation indicates an error signal e that has passed through the A/D conversion unit 21.

<The Noise Component Extraction Units 22>

Each noise component extraction unit 22 of the controller 15 extracts noise components Ak0, Ak1 at a prescribed extraction frequency fk (k=1, 2, . . . ) based on the error signal e at prescribed sampling cycles. More specifically, the noise component extraction unit 22 extracts the noise components Ak0, Ak1 at the extraction frequency fk as a complex signal having a real part and an imaginary part. The noise component extraction unit 22 outputs the extracted noise components Ak0, Ak1 together with the extraction frequency fk to the control target frequency determination unit 23.

The extraction frequencies fk are set to different values for the respective noise component extraction units 22. The extraction frequencies fk are set to frequencies (frequencies around 40-50 Hz) that can be a peak frequency of the drumming noise d. The number k of extraction frequencies fk (that is, the number of noise component extraction units 22) is set to an arbitrary integer equal to or larger than 2.

Each noise component extraction unit 22 includes a cosine wave generation circuit 31, a sine wave generation circuit 32, an extraction signal generation unit 33, and an adder 34.

The cosine wave generation circuit 31 generates an extraction cosine wave signal xck based on the extraction frequency fk, and outputs the generated extraction cosine wave signal xck to the extraction signal generation unit 33. The sine wave generation circuit 32 generates an extraction sine wave signal xsk based on the extraction frequency fk, and outputs the generated extraction sine wave signal xsk to the extraction signal generation unit 33.

The extraction signal generation unit 33 consists of an extraction filter Ak. A single-frequency adaptive notch filter (SAN filter) is used for the extraction filter Ak. The extraction signal generation unit 33 includes a first extraction filter unit 35, a second extraction filter unit 36, an adder 37, a first extraction update unit 38, and a second extraction update unit 39.

The first extraction filter unit 35 has an extraction filter coefficient Ak0. The extraction filter coefficient Ak0 forms a real part of a coefficient of the extraction filter Ak, and also forms a real part of the noise components (complex signal) extracted by the noise component extraction unit 22. The first extraction filter unit 35 filters the extraction cosine wave signal xck output from the cosine wave generation circuit 31.

The second extraction filter unit 36 has an extraction filter coefficient Ak1. The extraction filter coefficient Ak1 forms an imaginary part of the coefficient of the extraction filter Ak, and also forms an imaginary part of the noise components (complex signal) extracted by the noise component extraction unit 22. The second extraction filter unit 36 filters the extraction sine wave signal xsk output from the sine wave generation circuit 32.

The adder 37 generates an extraction signal ak by adding together the extraction cosine wave signal xck that has passed through the first extraction filter unit 35 and the extraction sine wave signal xsk that has passed through the second extraction filter unit 36. The adder 37 outputs the generated extraction signal ak to the adder 34.

The first extraction update unit 38 updates the extraction filter coefficient Ak0 at the sampling cycles using an adaptive algorithm such as Least Mean Square Algorithm (LMS algorithm). More specifically, the first extraction update unit 38 updates the extraction filter coefficient Ak0 such that a virtual error signal ek (that will be described later) output from the adder 34 is minimized.

The second extraction update unit 39 updates the extraction filter coefficient Ak1 at the sampling cycles using an adaptive algorithm such as the LMS algorithm. More specifically, the second extraction update unit 39 updates the extraction filter coefficient Ak1 such that the virtual error signal ek output from the adder 34 is minimized.

The adder 34 generates the virtual error signal ek by adding together the extraction signal ak output from the extraction signal generation unit 33 and the error signal e. The adder 34 outputs the generated virtual error signal ek to the extraction signal generation unit 33.

<The Control Target Frequency Determination Unit 23>

The control target frequency determination unit 23 of the controller 15 determines a control target frequency fc among a plurality of extraction frequencies fk based on the extraction frequency fk and the noise components Ak0, Ak1 (extraction filter coefficients) output from each noise component extraction unit 22. The control target frequency determination unit 23 outputs the determined control target frequency fc to the parameter selection unit 24, and also outputs the determined control target frequency fc and the corresponding noise components Ac0, Ac1 to the control signal output unit 25. A method of determining the control target frequency fc by the control target frequency determination unit 23 will be described later.

<The Parameter Selection Unit 24>

With reference to FIG. 3, the parameter selection unit 24 of the controller 15 stores a control parameter table T1. The control parameter table T1 is a table that defines the values of control parameters at each frequency. In the present embodiment, the control parameters include a feedback gain (FB gain), a feedback phase (FB phase), target noise reduction, and the like.

The parameter selection unit 24 selects a value of each control parameter corresponding to the control target frequency fc by referring to the control parameter table T1 based on the control target frequency fc output from the control target frequency determination unit 23. The parameter selection unit 24 outputs the selected value of each control parameter to the control signal output unit 25.

<The Control Signal Output Unit 25>

Figure 4:
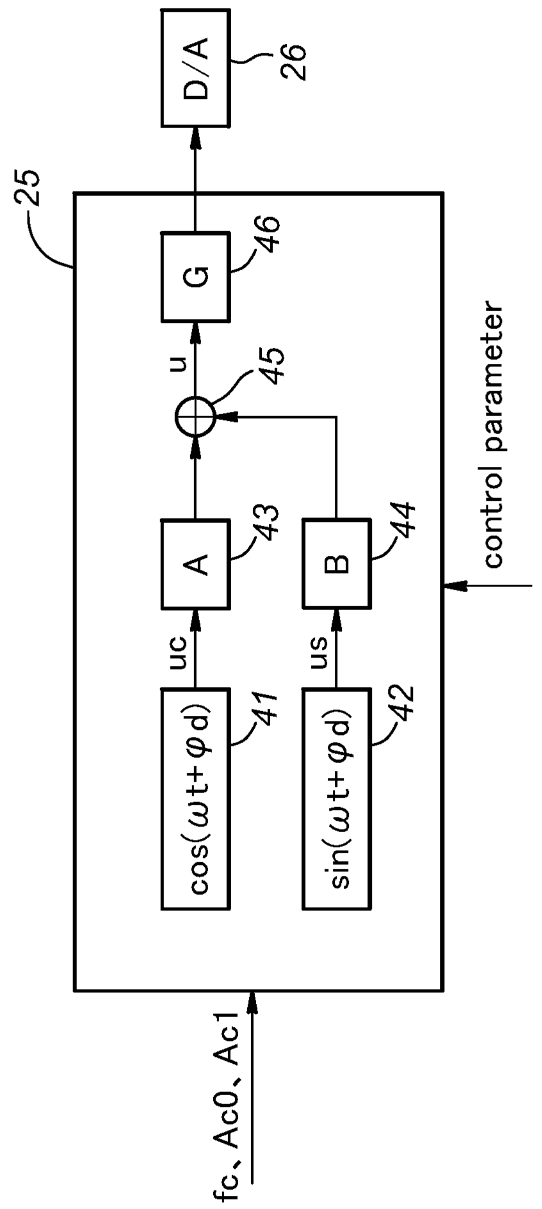
FIG. 4 is a functional block diagram showing a control signal output unit according to the first embodiment.

With reference to FIG. 4, the control signal output unit 25 of the controller 15 generates a control signal u for controlling the speaker 13 based on the control target frequency fc and the noise components Ac0, Ac1 output from the control target frequency determination unit 23 and the value of each control parameter output from the parameter selection unit 24. The control signal output unit 25 outputs the generated control signal u to the D/A conversion unit 26.

The control signal output unit 25 consists of a SAN filter. The control signal output unit 25 includes a cosine wave generation unit 41, a sine wave generation unit 42, a first control filter unit 43, a second control filter unit 44, an adder 45, and a gain adjustment unit 46.

The cosine wave generation unit 41 generates a control cosine wave signal uc=cos (ωt+φd) based on the control target frequency fc output from the control target frequency determination unit 23 and the value of the FB phase (one of the control parameters) output from the parameter selection unit 24. More specifically, the cosine wave generation unit 41 generates the control cosine wave signal uc by shifting the phase of a reference cosine wave cos (ωt) corresponding to the control target frequency fc by an angle φd corresponding to the FB phase. The cosine wave generation unit 41 outputs the generated control cosine wave signal uc to the first control filter unit 43.

The sine wave generation unit 42 generates a control sine wave signal us=sin (ωt+φd) based on the control target frequency fc output from the control target frequency determination unit 23 and the value of the FB phase (one of the control parameters) output from the parameter selection unit 24. More specifically, the sine wave generation unit 42 generates the control sine wave signal us by shifting the phase of a reference sine wave sin (ωt) corresponding to the control target frequency fc by an angle φd corresponding to the FB phase. The sine wave generation unit 42 outputs the generated control sine wave signal us to the second control filter unit 44.

The first control filter unit 43 has a control filter coefficient A. The first control filter unit 43 filters the control cosine wave signal uc output from the cosine wave generation unit 41. The control filter coefficient A is successively updated using the noise component Ac0 output from the control target frequency determination unit 23.

The second control filter unit 44 has a control filter coefficient B. The second control filter unit 44 filters the control sine wave signal us output from the sine wave generation unit 42. The control filter coefficient B is successively updated using the noise component Ac1 output from the control target frequency determination unit 23.

The adder 45 generates the control signal u by adding together the control cosine wave signal uc that has passed through the first control filter unit 43 and the control sine wave signal us that has passed through the second control filter unit 44. The adder 45 outputs the generated control signal u to the gain adjustment unit 46.

The gain adjustment unit 46 adjusts a gain of the control signal u output from the adder 45 based on the FB gain (one of the control parameters) output from the parameter selection unit 24. The gain adjustment unit 46 outputs the control signal u with the adjusted gain to the D/A conversion unit 26.

<The D/A Conversion Unit 26>

With reference to FIG. 2, the D/A conversion unit 26 of the controller 15 converts a digital control signal u output from the control signal output unit 25 into an analog control signal u. The D/A conversion unit 26 outputs the analog control signal u to the speaker 13. Thus, the speaker 13 generates the canceling sound y corresponding to the control signal u.

<The Control Target Frequency Determination Process>

The control target frequency determination unit 23 of the controller 15 executes a control target frequency determination process at the sampling cycles. In the control target frequency determination process, the control target frequency determination unit 23 determines the control target frequency fc based on the extraction frequency fk and the noise components Ak0, Ak1 output from each noise component extraction unit 22. In the following, regarding the description of the control target frequency determination process, "(n)" shown together with each symbol indicates the current value extracted or calculated at the current sample time. On the other hand, "(n−1)" shown together with each symbol indicates the previous value extracted or calculated at the previous sample time.

Figure 5:
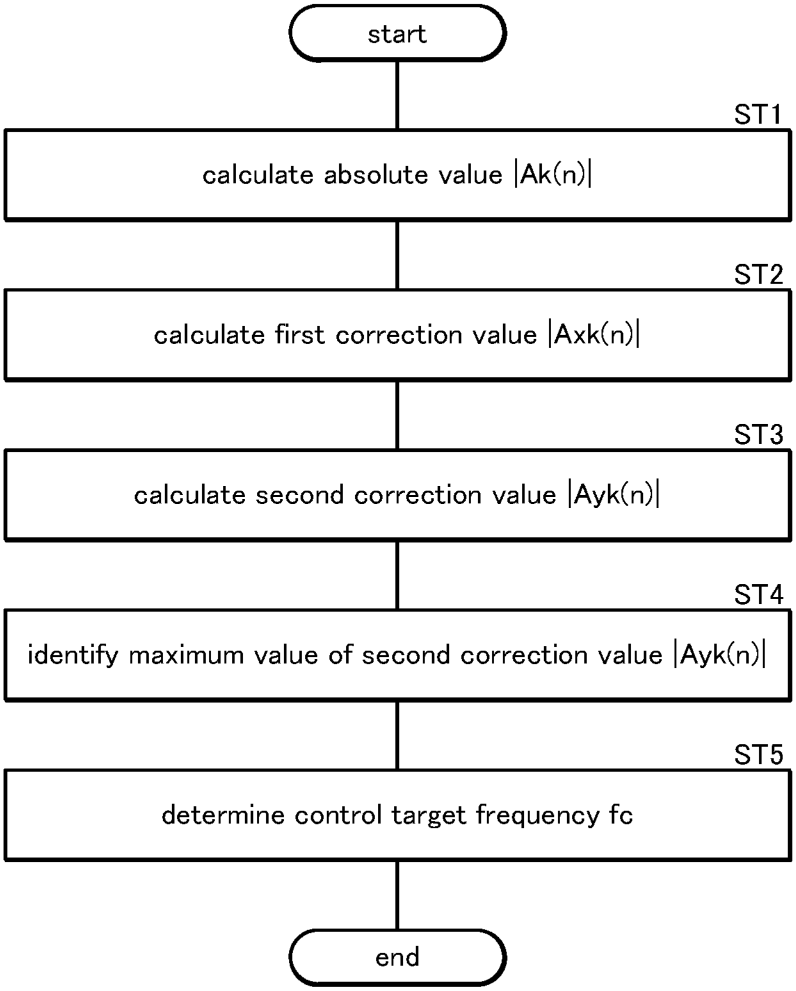
FIG. 5 is a flowchart showing a control target frequency determination process according to the first embodiment.

With reference to FIG. 5, when the control target frequency determination process is started, the control target frequency determination unit 23 uses the following formula (2) to calculate the current value |Ak(n)| of the absolute value of the noise components Ak0, Ak1 at each extraction frequency fk (step ST1).

$$|Ak(n)|=Ak0(n)^2+Ak1(n)^2 \tag{2}$$

By the way, in the above formula (2), the current value |Ak(n)| of the absolute value of the noise components Ak0, Ak1 is calculated based only on the current values of the noise components Ak0, Ak1. If such a calculation method is used, the control target frequency fc may be frequently switched due to a noise or the like included in the noise components Ak0, Ak1.

As such, the control target frequency determination unit 23 may calculate the current value |Ak(n)| of the absolute value of the noise components Ak0, Ak1 based on the current values of the noise components Ak0, Ak1 and the previous value |Ak(n−1)| of the absolute value of the noise components Ak0, Ak1. That is, the control target frequency determination unit 23 may use a time-averaged value of the absolute values of the noise components Ak0, Ak1 within a prescribed period as the current value |Ak(n)| of the absolute value of the noise components Ak0, Ak1. For example, the control target frequency determination unit 23 may use the following formula (3) instead of the above formula (2) to calculate the current value |Ak(n)|.

$$|Ak(n)|=q\times|Ak(n-1)|+(1-\eta)\times\sqrt{Ak0(n)^2+Ak1(n)^2},\quad 0<\eta<1 \tag{3}$$

Hereinafter, the current value |Ak(n)| of the absolute value of the noise components Ak0, Ak1 calculated in step ST1 will be referred to as the absolute value |Ak(n)| of the noise components Ak0, Ak1.

Next, the control target frequency determination unit 23 corrects the absolute value |Ak(n)| of the noise components Ak0, Ak1 based on the control effect (the effect of reducing the drumming noise d). More specifically, the control target frequency determination unit 23 calculates the first correction value |Axk(n)| of the absolute value |Ak(n)| of the noise components Ak0, Ak1 by correcting the absolute value |Ak(n)| of the noise components Ak0, Ak1 based on the target noise reduction (one of the control parameters) at each frequency (step ST2). For example, the control target frequency determination unit 23 uses the following formula (4) to calculate the first correction value |Axk(n)|. Incidentally, "TR" in the following formula (4) indicates the target noise reduction at each frequency.

$$|Axk(n)|=\beta*|Ak(n)|,\ \rho=10^{TR/20} \quad (4)$$

The absolute value |Ak(n)| of the noise components Ak0, Ak1 calculated in step ST1 is a value corresponding to the noise components Ak0, Ak1 after noise reduction (after control). In contrast, what should be canceled by the canceling sound y from the speaker 13 is not the drumming noise d after noise reduction (after control) but the drumming noise d before noise reduction (before control). As such, the control target frequency determination unit 23 converts the value corresponding to the noise components Ak0, Ak1 after noise reduction (after control) into the value corresponding to the noise components Ak0, Ak1 before noise reduction (before control) by correcting the absolute value |Ak(n)| of the noise components Ak0, Ak1 using the above formula (4). For example, when the target noise reduction is 6 dB, the coefficient β in the above formula (4) is approximately "2".

Next, the control target frequency determination unit 23 corrects the first correction value |Axk(n)| based on evaluation criteria (hearing characteristics of humans). More specifically, the control target frequency determination unit 23 calculates the second correction value |Ayk(n)| of the absolute value |Ak(n)| of the noise components Ak0, Ak1 by correcting the first correction value |Axk(n)| based on a correction table T2 (step ST3).

With reference to FIG. 6, the correction table T2 is a table that defines a correction coefficient for each frequency according to the hearing characteristics of humans. In the present embodiment, the correction table T2 defines the correction coefficient for each frequency based on the so-called "A characteristics". In another embodiment, the correction table T2 may define the correction coefficient for each frequency based on the evaluation criteria other than the hearing characteristics of humans.

For example, the control target frequency determination unit 23 calculates the second correction value |Ayk(n)| by correcting the first correction value |Axk(n)| using the following formula (5). Incidentally, "α" in the following formula (5) indicates the correction coefficient set based on the correction table T2.

$$|Ayk(n)|=\alpha*|Axk(n)| \quad (5)$$

With reference to FIG. 5, next, the control target frequency determination unit 23 identifies the maximum value of the second correction value |Ayk(n)| by comparing the second correction values (|Ay1(n)|, . . . , |Ayk(n)|) at all the extraction frequencies fk (step ST4).

Next, the control target frequency determination unit 23 determines a corresponding extraction frequency fk (the extraction frequency fk corresponding to the maximum value of the second correction value |Ayk(n)|) as the control target frequency fc (step ST5). Accordingly, the control target frequency determination process ends.

<The Effect>

In the first embodiment, the controller 15 extracts the noise components Ak0, Ak1 at the plurality of extraction frequencies fk based on the error signal e, determines the control target frequency fc among the plurality of extraction frequencies fk based on the noise components Ak0, Ak1 at the plurality of extraction frequencies fk, selects the values of the prescribed control parameters based on the control target frequency fc, and generates the control signal u for controlling the speaker 13 based on the selected values of the control parameters. By determining the control target frequency fc among the plurality of extraction frequencies fk in this way, it is possible to cause the control target frequency fc to follow the change in the peak frequency of the drumming noise due to the change in the traveling condition of the vehicle 1. Accordingly, it is possible to effectively reduce the drumming noise d at the peak frequency.

Figure 7A:
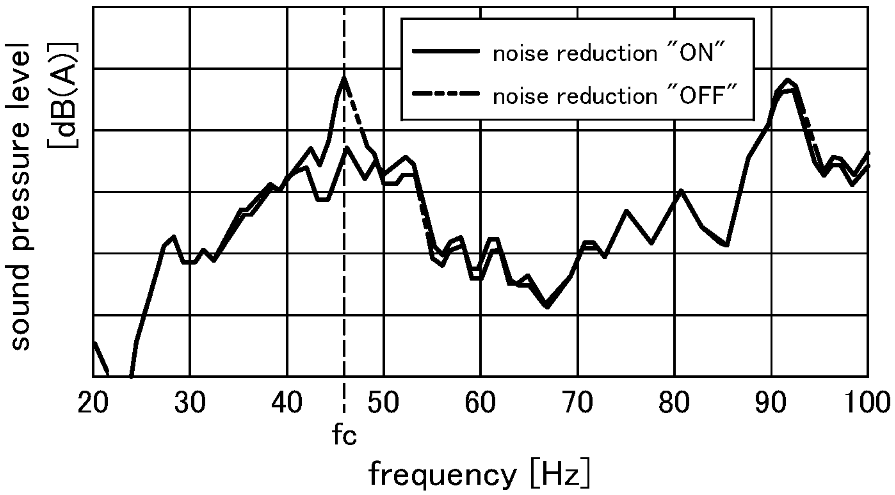
FIGS. 7A to 7C are graphs each showing the reduction effect of a drumming noise.
Figure 7B:
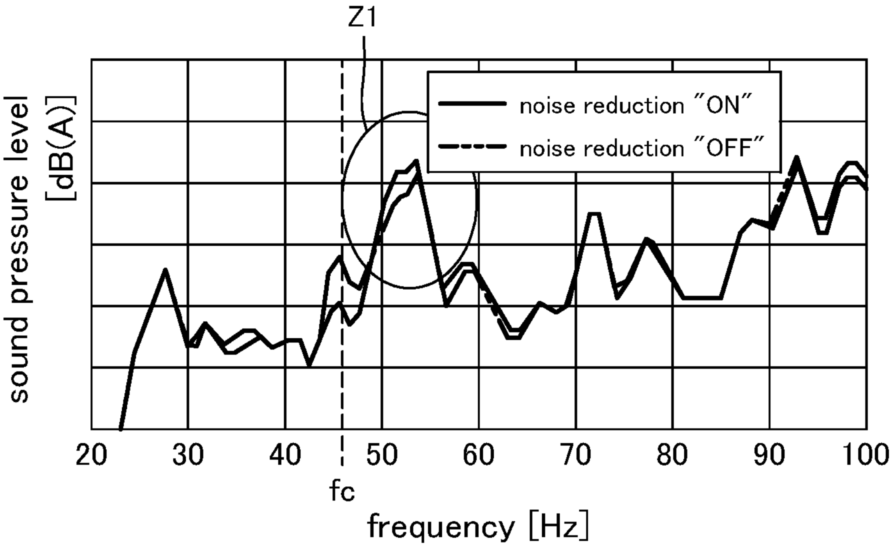
Figure 7C:
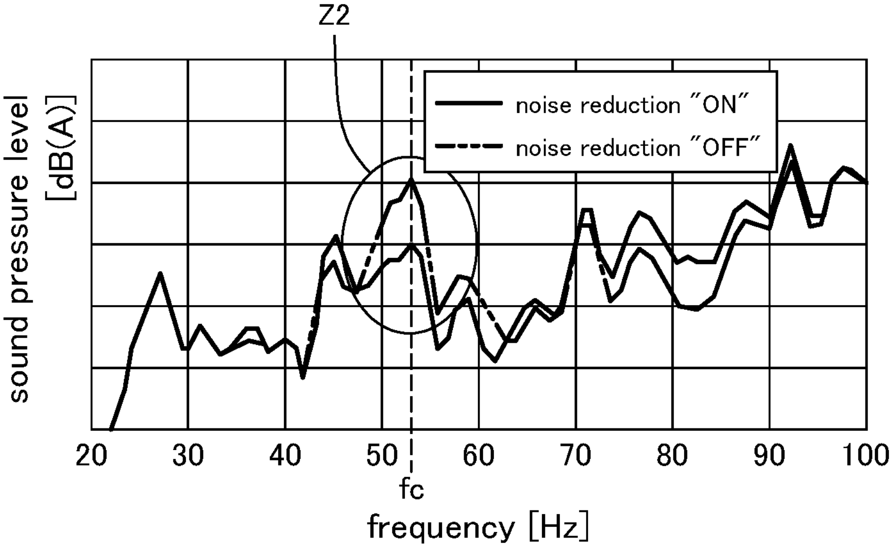

Next, the effect of reducing the drumming noise d as described above will be further described with reference to FIGS. 7A to 7C. FIG. 7A shows a state (for example, a state where the peak frequency of the drumming noise d exists around 46 Hz) before the peak frequency of the drumming noise d changes in the conventional noise reduction system and the noise reduction system 11 according to the present embodiment. FIGS. 7B and 7C respectively show a state (for example, a state where the peak frequency of the drumming noise d exists around 53 Hz) after the peak frequency of the drumming noise d has changed in the conventional noise reduction system and the noise reduction system 11 according to the present embodiment.

With reference to FIGS. 7A and 7B, in the conventional noise reduction system, the control target frequency fc is constant, and thus the control target frequency fc does not change even if the peak frequency of the drumming noise d changes. Accordingly, the control target frequency fc cannot follow the change in the peak frequency of the drumming noise d, and the drumming noise d remains at the peak frequency (see an oval Z1 in FIG. 7B).

On the other hand, with reference to FIGS. 7A and 7C, in the noise reduction system 11 according to the present embodiment, the control target frequency fc is variable, and thus the control target frequency fc automatically changes according to the change in the peak frequency of the drumming noise d. Accordingly, the control target frequency fc can follow the change in the peak frequency of the drumming noise d, so that the drumming noise d can be effectively reduced at the peak frequency (see an oval Z2 in FIG. 7C).

The Second Embodiment

Next, the second embodiment of the present invention will be described with reference to FIGS. 8-10. Explanations that duplicate those for the first embodiment of the present invention will be omitted as appropriate. Symbols "ADA" in FIG. 9 indicate "adaptive".

<The Parameter Selection Unit 24>

With reference to FIG. 8, the parameter selection unit 24 of the controller 15 stores a control parameter table T3. The control parameter table T3 is a table that defines the values of control parameters for each frequency. In the present embodiment, the control parameters include step size parameters μ1, μ2, target noise reduction, a feedback gain upper limit (FB gain upper limit), and the like.

The step size parameters μ1 and μ2 are parameters for adjusting the update amount of the SAN filter used in the control signal output unit 25 (that will be described later). As the step size parameters μ1 and μ2 increase, the update amount of the SAN filter also increases. As the values of the step size parameters μ1 and μ2 decrease, the update amount of the SAN filter also decreases.

The parameter selection unit 24 selects the values of the control parameters corresponding to the control target frequency fc by referring to the control parameter table T3 based on the control target frequency fc output from the control target frequency determination unit 23. The parameter selection unit 24 outputs the selected values of the control parameters to the control signal output unit 25.

<The Control Target Signal Generation Unit 27>

Figure 9:
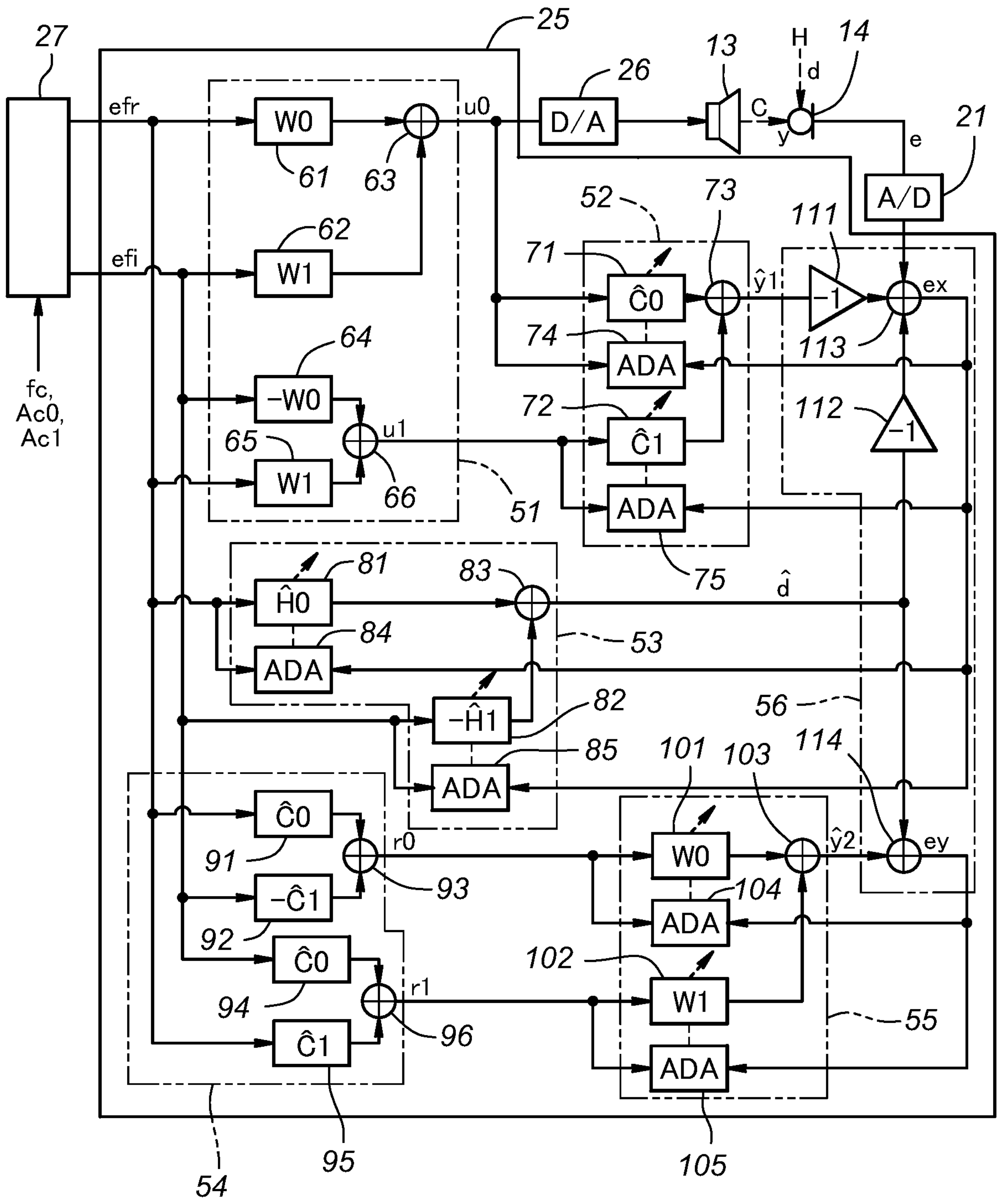
FIG. 9 is a functional block diagram showing a control signal output unit according to the second embodiment.
Figure 10:
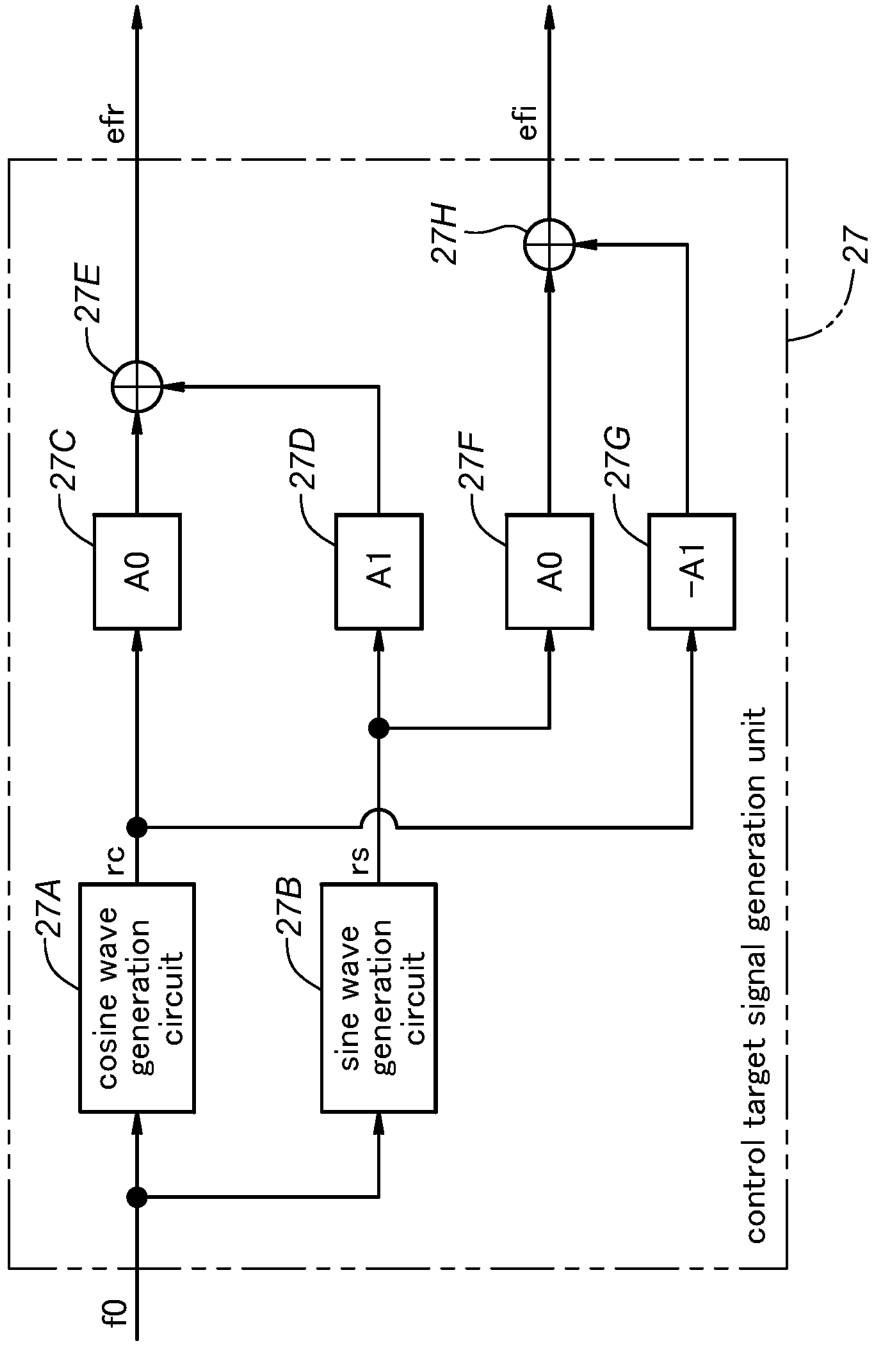
FIG. 10 is a functional block diagram showing a control target signal generation unit according to the second embodiment.

With reference to FIGS. 9 and 10, the controller 15 according to the second embodiment includes a control target signal generation unit 27 in addition to the components of the controller 15 according to the first embodiment. The control target signal generation unit 27 includes a cosine wave generation circuit 27A, a sine wave generation circuit 27B, a first filter unit 27C, a second filter unit 27D, a first adder 27E, a third filter unit 27F, a fourth filter unit 27G, and a second adder 27H.

The cosine wave generation circuit 27A generates a cosine wave signal rc based on the reference frequency f0 corresponding to the control target frequency fc. The sine wave generation circuit 27B generates a sine wave signal rs based on the reference frequency f0.

The first filter unit 27C has a first filter coefficient A0 corresponding to the noise component Ac0. The first filter unit 27C filters the cosine wave signal rc. The second filter unit 27D has a second filter coefficient A1 corresponding to the noise component Ac1. The second filter unit 27D filters the sine wave signal rs. The first adder 27E generates a control target signal efr by adding together the cosine wave signal rc that has passed through the first filter unit 27C and the sine wave signal rs that has passed through the second filter unit 27D.

The third filter unit 27F has the first filter coefficient A0. The third filter unit 27F filters the sine wave signal rs. The fourth filter unit 27G has a coefficient acquired by reversing the polarity of the second filter coefficient A1. The fourth filter unit 27G filters the cosine wave signal rc. The second adder 27H generates a control target signal efi by adding together the sine wave signal rs that has passed through the third filter unit 27F and the cosine wave signal rc that has passed through the fourth filter unit 27G.

<The Control Signal Output Unit 25>

With reference to FIG. 9, the control signal output unit 25 of the controller 15 includes a control signal generation unit 51, a canceling estimation signal generation unit 52, a noise estimation signal generation unit 53, a reference signal generation unit 54, a control filter update unit 55, and a virtual error signal generation unit 56.

The control signal generation unit 51 consists of a control filter W. A SAN filter is used for the control filter W. The control signal generation unit 51 includes a first control filter unit 61, a second control filter unit 62, a first adder 63, a third control filter unit 64, a fourth control filter unit 65, and a second adder 66.

The first control filter unit 61 has a control filter coefficient W0. The control filter coefficient W0 forms a real part of a coefficient of the control filter W. The first control filter unit 61 filters the control target signal efr output from the control target signal generation unit 27.

The second control filter unit 62 has a control filter coefficient W1. The control filter coefficient W1 forms an imaginary part of the coefficient of the control filter W. The second control filter unit 62 filters the control target signal efi output from the control target signal generation unit 27.

The first adder 63 generates a control signal u0 by adding together the control target signal efr that has passed through the first control filter unit 61 and the control target signal efi that has passed through the second control filter unit 62. The first adder 63 outputs the generated control signal u0 to the D/A conversion unit 26 and the canceling estimation signal generation unit 52.

The third control filter unit 64 has a coefficient acquired by reversing the polarity of the control filter coefficient W0. The third control filter unit 64 filters the control target signal efi output from the control target signal generation unit 27.

The fourth control filter unit 65 has the control filter coefficient W1. The fourth control filter unit 65 filters the control target signal efr output from the control target signal generation unit 27.

The second adder 66 generates a control signal u1 by adding together the control target signal efi that has passed through the third control filter unit 64 and the control target signal efr that has passed through the fourth control filter unit 65. The second adder 66 outputs the generated control signal u1 to the canceling estimation signal generation unit 52.

The canceling estimation signal generation unit 52 consists of a secondary path filter $\hat{C}$. The secondary path filter $\vec{C}$ is a filter corresponding to an estimation value of transfer characteristics C of a secondary path from the speaker 13 to the error microphone 14. A SAN filter is used for the secondary path filter $\hat{C}$. The canceling estimation signal generation unit 52 includes a first secondary path filter unit 71, a second secondary path filter unit 72, an adder 73, a first secondary path update unit 74, and a second secondary path update unit 75.

The first secondary path filter unit 71 has a secondary path filter coefficient $\hat{C}$0. The secondary path filter coefficient $\hat{C}$0 forms a real part of a coefficient of the secondary path filter $\hat{C}$. The first secondary path filter unit 71 filters the control signal u0 output from the control signal generation unit 51.

The second secondary path filter unit 72 has a secondary path filter coefficient C1. The secondary path filter coefficient $\hat{C}$1 forms an imaginary part of the coefficient of the secondary path filter $\hat{C}$. The second secondary path filter unit 72 filters the control signal u1 output from the control signal generation unit 51.

The adder 73 generates a first canceling estimation signal $\hat{y}$1 by adding together the control signal u0 that has passed through the first secondary path filter unit 71 and the control signal u1 that has passed through the second secondary path filter unit 72. The first canceling estimation signal $\hat{y}$1 is a signal corresponding to an estimation value of the canceling sound y. The adder 73 outputs the generated first canceling estimation signal $\hat{y}$1 to the virtual error signal generation unit 56.

The first secondary path update unit 74 updates the secondary path filter coefficient $\hat{C}$0 at prescribed sampling cycles using an adaptive algorithm such as the LMS algorithm. More specifically, the first secondary path update unit 74 updates the coefficient $\hat{C}$0 of the secondary path filter such that a virtual error signal ex (that will be described later) output from the virtual error signal generation unit 56 is minimized.

The second secondary path update unit 75 updates the secondary path filter coefficient C^1 at the sampling cycles using an adaptive algorithm such as the LMS algorithm. More specifically, the second secondary path update unit 75 updates the secondary path filter coefficient C^1 such that the virtual error signal ex output from the virtual error signal generation unit 56 is minimized.

The noise estimation signal generation unit 53 consists of a primary path filter H^. The primary path filter H^is a filter corresponding to an estimation value of transfer characteristics H of a path (primary path) from a noise source (in the present embodiment, the road surface S) to the error microphone 14. A SAN filter is used for the primary path filter H^. The noise estimation signal generation unit 53 includes a first primary path filter unit 81, a second primary path filter unit 82, an adder 83, a first primary path update unit 84, and a second primary path update unit 85.

The first primary path filter unit 81 has a primary path filter coefficient H^0. The primary path filter coefficient H^0 forms a real part of a coefficient of the primary path filter H^. The first primary path filter unit 81 filters the control target signal efr output from the control target signal generation unit 27.

The second primary path filter unit 82 has a coefficient acquired by reversing the polarity of a primary path filter coefficient H^1. The primary path filter coefficient H^1 forms an imaginary part of the coefficient of the primary path filter H^. The second primary path filter unit 82 filters the control target signal efi output from the control target signal generation unit 27.

The adder 83 generates a noise estimation signal d^ by adding together the control target signal efr that has passed through the first primary path filter unit 81 and the control target signal efi that has passed through the second primary path filter unit 82. The noise estimation signal d^is a signal corresponding to an estimation value of the drumming noise d. The adder 83 outputs the generated noise estimation signal d^ to the virtual error signal generation unit 56.

The first primary path update unit 84 updates the primary path filter coefficient H^0 at the sampling cycles using an adaptive algorithm such as the LMS algorithm. More specifically, the first primary path update unit 84 updates the primary path filter coefficient H^0 such that the virtual error signal ex output from the virtual error signal generation unit 56 is minimized.

The second primary path update unit 85 updates the primary path filter coefficient H^1 at the sampling cycles using an adaptive algorithm such as the LMS algorithm. More specifically, the second primary path update unit 85 updates the primary path filter coefficient H^1 such that the virtual error signal ex output from the virtual error signal generation unit 56 is minimized.

The reference signal generation unit 54, like the canceling estimation signal generation unit 52, consists of the secondary path filter C^. When the coefficients (C^0, C^1) of the secondary path filter C^ are updated in the canceling estimation signal generation unit 52, the updated coefficients of the secondary path filter C^ are output to the reference signal generation unit 54, and the coefficients of the secondary path filter C^ are updated in the reference signal generation unit 54. That is, the coefficients of the secondary path filter C^ set in the reference signal generation unit 54 are not fixed values but values that are successively updated based on the signal from the canceling estimation signal generation unit 52.

The reference signal generation unit 54 includes a third secondary path filter unit 91, a fourth secondary path filter unit 92, a first adder 93, a fifth secondary path filter unit 94, a sixth secondary path filter unit 95, and a second adder 96.

The third secondary path filter unit 91 has the secondary path filter coefficient C^0. The third secondary path filter unit 91 filters the control target signal efr output from the control target signal generation unit 27.

The fourth secondary path filter unit 92 has a coefficient acquired by reversing the polarity of the coefficient C^1 of the secondary path filter. The fourth secondary path filter unit 92 filters the control target signal efi output from the control target signal generation unit 27.

The first adder 93 generates a reference signal r0 by adding together the control target signal efr that has passed through the third secondary path filter unit 91 and the control target signal efi that has passed through the fourth secondary path filter unit 92. The first adder 93 outputs the generated reference signal r0 to the control filter update unit 55.

The fifth secondary path filter unit 94 has the secondary path filter coefficient C^0. The fifth secondary path filter unit 94 filters the control target signal efi output from the control target signal generation unit 27.

The sixth secondary path filter unit 95 has the secondary path filter coefficient C^1. The sixth secondary path filter unit 95 filters the control target signal efr output from the control target signal generation unit 27.

The second adder 96 generates a reference signal r1 by adding together the control target signal efi that has passed through the fifth secondary path filter unit 94 and the control target signal efr that has passed through the sixth secondary path filter unit 95. The second adder 96 outputs the generated reference signal r1 to the control filter update unit 55.

The control filter update unit 55, like the control signal generation unit 51, consists of the control filter W. The control filter update unit 55 includes a fifth control filter unit 101, a sixth control filter unit 102, an adder 103, a first control update unit 104, and a second control update unit 105.

The fifth control filter unit 101 has the control filter coefficient W0. The fifth control filter unit 101 filters the reference signal r0 output from the reference signal generation unit 54.

The sixth control filter unit 102 has the control filter coefficient W1. The sixth control filter unit 102 filters the reference signal r1 output from the reference signal generation unit 54.

The adder 103 generates a second canceling estimation signal y^2 by adding together the reference signal r0 that has passed through the fifth control filter unit 101 and the reference signal r1 that has passed through the sixth control filter unit 102. The second canceling estimation signal y^2 is a signal corresponding to an estimation value of the canceling sound y. The adder 103 outputs the generated second canceling estimation signal y^2 to the virtual error signal generation unit 56.

The first control update unit 104 updates the control filter coefficient W0 at the sampling cycles using an adaptive algorithm such as the LMS algorithm. More specifically, the first control update unit 104 updates the control filter coefficient W0 such that a virtual error signal ey (that will be described later) output from the virtual error signal generation unit 56 is minimized.

The second control update unit 105 updates the control filter coefficient W1 at the sampling cycles using an adaptive algorithm such as the LMS algorithm. More specifically, the second control update unit 105 updates the control filter coefficient W1 such that the virtual error signal ey output from the virtual error signal generation unit 56 is minimized.

When the coefficients (W0, W1) of the control filter W are updated in the control filter update unit 55, the updated coefficients of the control filter W are output to the control signal generation unit 51, and the coefficients of the control filter W are updated in the control signal generation unit 51. That is, the coefficients of the control filter W set in the control signal generation unit 51 are not fixed values but values that are successively updated based on the signal from the control filter update unit 55.

The virtual error signal generation unit 56 includes a first polarity reversing circuit 111, a second polarity reversing circuit 112, a first adder 113, and a second adder 114.

The first polarity reversing circuit 111 reverses the polarity of the first canceling estimation signal y^1 output from the canceling estimation signal generation unit 52. The second polarity reversing circuit 112 reverses the polarity of the noise estimation signal d^output from the noise estimation signal generation unit 53.

The first adder 113 generates the virtual error signal ex by adding together the error signal e, the first canceling estimation signal y^1 that has passed through the first polarity reversing circuit 111, and the noise estimation signal d^ that has passed through the second polarity reversing circuit 112. The first adder 113 outputs the generated virtual error signal ex to the canceling estimation signal generation unit 52 and the noise estimation signal generation unit 53.

The second adder 114 generates the virtual error signal ey by adding together the noise estimation signal d^output from the noise estimation signal generation unit 53 and the second canceling estimation signal y^2 output from the control filter update unit 55. The second adder 114 outputs the generated virtual error signal ey to the control filter update unit 55.

<The Effect>

In the second embodiment, the controller 15 uses an adaptive algorithm to update the control filter W, the primary path filter H^, and the secondary path filter C^. Accordingly, acoustic characteristics of the vehicle cabin 5 can be learned during execution of the feedback control, and the effect of reducing the drumming noise d can be enhanced.

Modified Embodiments

In the above second embodiment, the controller 15 uses an adaptive algorithm to update all of the control filter W, the primary path filter H^, and the secondary path filter C^. On the other hand, in another embodiment, the controller 15 may use an adaptive algorithm to update only some of the control filter W, the primary path filter H^, and the secondary path filter C^. For example, the controller 15 may update the primary path filter H^ and the secondary path filter C^ using an adaptive algorithm, and calculate the control filter W with a formula using the updated values of the primary path filter H^ and the secondary path filter C^.

In the above first and second embodiments, the noise reduction system 11 is applied to the vehicle 1 to reduce the drumming noise d. On the other hand, in another embodiment, the noise reduction system 11 may be applied to the vehicle 1 to reduce the noise other than the drumming noise d (for example, the noise from a drive source such as an internal combustion engine and an electric motor), or may be applied to a mobile body (for example, an aircraft or the like) other than the vehicle 1.

Concrete embodiments of the present invention have been described in the foregoing, but the present invention should not be limited by the foregoing embodiments and various modifications and alterations are possible within the scope of the present invention.

The invention claimed is:

1. An active noise reduction system, comprising:

a canceling sound generator configured to generate a canceling sound for canceling a noise;

an error detector configured to detect an error between the noise and the canceling sound and generate an error signal corresponding to the error; and a controller configured to control the canceling sound generator based on the error signal, wherein the controller is configured to:

extract noise components at a plurality of frequencies based on the error signal, determine a control target frequency among the plurality of frequencies based on the noise components at the plurality of frequencies;

select a value of a prescribed control parameter based on the control target frequency; and generate a control signal to control the canceling sound generator based on the selected value of the control parameter, wherein the canceling sound generator is configured to generate the canceling sound corresponding to the control signal, wherein the controller is further configured to:

calculate absolute values of the noise components at the plurality of frequencies;

calculate correction values of the noise components at the plurality of frequencies by correcting the absolute values of the noise components at the plurality of frequencies;

identify a maximum value among the correction values of the noise components at the plurality of frequencies by comparing the correction values of the noise components at the plurality of frequencies; and determine a corresponding frequency as the control target frequency, the corresponding frequency corresponding to the maximum value among the correction values of the noise components.

2. The active noise reduction system according to claim 1, wherein the controller is further configured to correct the absolute values of the noise components at the plurality of frequencies based on a correction table that defines a correction coefficient for each of the plurality of frequencies according to hearing characteristics of humans.

3. The active noise reduction system according to claim 1, wherein the controller is further configured to correct the absolute values of the noise components at the plurality of frequencies based on target noise reduction at each of the plurality of frequencies.

4. The active noise reduction system according to claim 1, wherein the controller is further configured to:

at prescribed sampling cycles, extract the noise components at the plurality of frequencies and calculate the absolute values of the noise components at the plurality of frequencies; and calculate a current value of the absolute value of the noise component at each of the plurality of frequencies based on a previous value of the absolute value of the noise component at each of the plurality of frequencies and a current value of the noise component at each of the plurality of frequencies.

5. The active noise reduction system according to claim 1, wherein the controller is further configured to:

store a control parameter table that defines the value of the control parameter at each of the plurality of frequencies; and select the value of the control parameter corresponding to the control target frequency by referring to the control parameter table based on the control target frequency.

* * * * *